W. E. WINTERS.
LUBRICATOR.
APPLICATION FILED MAR. 29, 1913.
1,096,658.
Patented May 12, 1914.
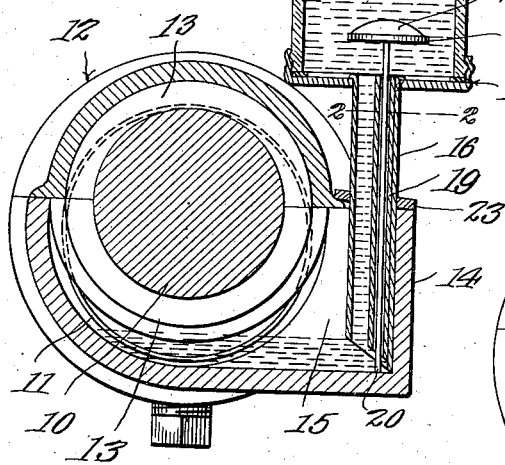
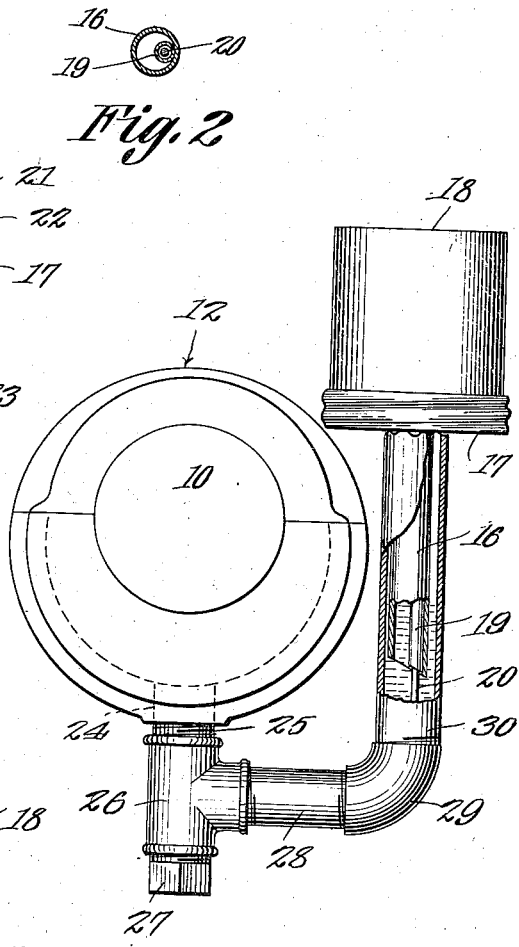
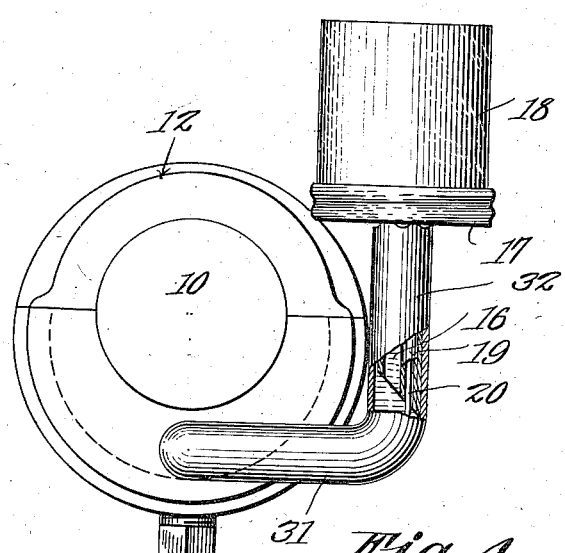
WITNESSES
E. F. Camp
William E. Winters
INVENTOR,
Attorney

UNITED STATES PATENT OFFICE.

WILLIAM E. WINTERS, OF ONEIDA, NEW YORK.

LUBRICATOR.

1,096,658.

Specification of Letters Patent.     Patented May 12, 1914.

Application filed March 29, 1913. Serial No. 757,542.

*To all whom it may concern:*

Be it known that I, WILLIAM E. WINTERS, a citizen of the United States, residing at Oneida, in the county of Madison and State of New York, have invented certain new and useful Improvements in Lubricators, of which the following is a specification.

This invention has for its object to provide a novel and improved automatic lubricating device which may be applied to any shaft, bearing journal, or other machine element requiring lubrication.

The invention also has for its object to provide a lubricant reservoir which can be readily mounted in place and which can be applied or removed without danger of spilling the oil, a valve being provided which closes automatically to shut the lubricant outlet when the reservoir is removed from the bearing or other part to which it may be applied.

These objects are attained by means of a novel combination and arrangement of parts to be hereinafter described and claimed, reference being had to the accompanying drawing, in which—

Figure 1 is a cross section showing the application of the invention. Fig. 2 is a horizontal section on the line 2—2 of Fig. 1. Figs. 3 and 4 are elevations, partly broken away, showing slight modifications of the structure to which the lubricant is applied.

Referring specifically to the drawing, 10 denotes a shaft equipped with a lubricant ring 11. The shaft is supported in a hanger or other bearing, the box of which is indicated at 12 and the brasses at 13. The lower half of the box is cast on one side, with a lug 14 containing a cavity 15 which opens through the top thereof and the side of the lower half of the box, and extends down to the bottom of the latter.

Into the cavity 15 extends a tube 16 secured to a cap 17 which is screwed on the bottom of the lubricant reservoir 18, the latter being made of glass so that the lubricant supply may be observed at all times, in view of which, there is no danger of the reservoir running dry without that fact being displayed.

In the tube 16 is mounted a discharge tube 19. Both of these tubes open through the cap 17 into the reservoir 18. The tube 19 is eccentrically mounted in the tube 16 and is in contact with one side thereof to which it is soldered. Any other method may be employed for fastening the tube in spaced relation. The lower end of the tube 16 is cut on a slant and rests on the floor of the cavity 15.

In operation, a supply of lubricant is automatically maintained in the box 12. The lubricant flows from the reservoir 18 down the tube 19 and is discharged into the cavity 15 at the bottom thereof, from which it flows into the box. A uniform level of lubricant is maintained by the tube 16 which serves as an air tube to allow air to pass into the reservoir and replace the oil as it leaves the same. The lubricant flows into the box and collects therein until its level reaches the upper end of the slanting portion of the bottom of the tube 16, whereupon, the flow of lubricant ceases as the escape of air is cut off. As soon as the lubricant level drops sufficiently to uncover the lower end of the tube 16, the air rises in bubbles in the tube 16, and the lubricant again commences to flow from the reservoir, the flow continuing until the lower end of the tube 16 is again covered. It will therefore be seen that the lubricant is automatically maintained at a constant level in the box and the bearing is therefore kept properly lubricated. By providing the tube 16, there is avoided any interference between the oil passing down the tube 19 and the rising bubbles of air.

The tubes 16 and 19 seat loosely in the cavity 15 so that they may be readily removed. In order to prevent the lubricant from escaping from the tubes 16 and 19 when the device is removed from the bearing, a valve is provided which will now be described.

In the tube 19 is loosely mounted a stem 20 of such length that it may project from both ends thereof, one end projecting from the discharge end and the other end projecting from the inlet end into the reservoir 18. The last-mentioned end of the stem has a head 21 on the bottom of which is a disk 22 of leather or other suitable material, said disk being designed to seat on and cover the upper end of the tubes 16 and 19. The stem 20 is thin so that it will not prevent the flow of lubricant through the tube 19.

The valve operates as follows: When the reservoir is removed from the bearing, the stem 20 slides down and the valve disk 22 is seated on the upper ends of the tubes 16 and 19 to close the same. No lubricant can now escape from the reservoir, and the device may be carried without danger of spilling the lubricant. When the valve disk is seated, the stem 20 projects from the outlet end of the tubes 16 and 19. Thus, when the tubes are inserted into the cavity 15 and the stem engages the bottom thereof, it is forced upward and the valve disk is unseated, after which the hereinbefore described flow of lubricant may take place.

The tube 16 carries a leather disk or washer 23 which seats on top of the lug 14 when the device is in position for use to prevent entry of dust or dirt into the cavity 15.

Fig. 3 shows the invention applied to an old bearing, in the bottom of which is a threaded hole 24 for drawing off old oil and sediment, said hole being usually closed by a screw plug. In applying the invention, this screw plug is removed, and a pipe 25 is screwed into the hole. To this pipe is connected a T-coupling 26, one end of which is closed by a screw plug 27 which may be the one which was removed from the hole 24. To the side branch of the T-coupling is connected one end of a short pipe 28, to the other end of which is connected an elbow 29 carrying a vertical pipe 30. This last-mentioned pipe carries the reservoir 18, and the tubes 16 and 19 depending therefrom, said tubes extending into the pipe. The connections herein described are so dimensioned that the lower end of the air tube is properly located to give the desired lubricant level in the box.

Fig. 4 shows another modification. To one end of the box is connected a pipe 31 having a vertical portion 32 to which the reservoir and the tubes are connected in the same manner as shown in Fig. 3.

The several forms of the device herein described keep the bearing perfectly lubricated. The lubricant is supplied uniformly and there is no danger of flooding the bearings. The reservoir can be removed at any time and refilled without stopping the machinery. It is also possible to remove the cap of the bearing without disturbing the lubricating device.

The preferred embodiments of the invention have been shown, but it will be understood that various other minor changes in the structural details may be resorted to without a departure from the invention.

I claim:

1. A lubricant reservoir having an air and a discharge tube depending from the bottom thereof, said tubes being mounted one within the other and opening into the reservoir, a stem loosely mounted in one of the tubes and extending at one end into the reservoir, and a valve carried by the said end of the stem and adapted to seat on the tubes to close the same, the length of the stem being such that it projects from the other ends of the tubes when the valve is seated.

2. The combination with a bearing having a lubricant inlet, of a lubricant reservoir having an air and a discharge tube depending from the bottom thereof into the inlet and removable therefrom, said tubes being mounted one within the other and opening into the reservoir, a stem loosely mounted in one of the tubes and extending at one end to the reservoir, and a valve carried by said end of the stem and adapted to seat on the tubes to close the same, the length of the stem being such that it projects from the opposite ends of the tubes when the valve is seated, said projecting end of the stem being engageable with the bottom of the aforesaid lubricant inlet to open and hold the valve open.

3. A lubricant reservoir having a tube depending from the bottom thereof and having its lower end cut off at a slant, a discharge tube extending through said tube and fixed thereto, both of said tubes opening into the reservoir, a stem loosely mounted in the discharge tube and extending at one end into the reservoir, and a valve carried by said end of the stem and adapted to seat on the tubes to close the same, the length of the stem being such that it projects from the outlet end of the discharge tube when the valve is seated.

In testimony whereof I affix my signature in presence of two witnesses.

WILLIAM E. WINTERS.

Witnesses:
J. F. GROWER,
C. H. MILLER.